(No Model.)

E. B. BENHAM.
BALANCED VALVE.

No. 341,827.  Patented May 11, 1886.

WITNESSES:
Wm H Chapin
W. F. Rice

INVENTOR
Elijah B Benham
BY
Henry A Chapin
ATTORNEY ced together. The operation of my improvements is as
UNITED STATES PATENT OFFICE.

ELIJAH B. BENHAM, OF HOLYOKE, MASSACHUSETTS, ASSIGNOR OF TWO-THIRDS TO ROSWELL M. FAIRFIELD AND ROLAND T. OAKES, BOTH OF SAME PLACE.

BALANCED VALVE.

SPECIFICATION forming part of Letters Patent No. 341,827, dated May 11, 1886.

Application filed August 31, 1885. Serial No. 175,762. (No model.)

*To all whom it may concern:*

Be it known that I, ELIJAH B. BENHAM, a citizen of the United States, residing at Holyoke, in the county of Hampden and State of Massachusetts, have invented new and useful Improvements in Balanced Valves, of which the following is a specification.

This invention relates to improvements in balanced valves for water and other fluid-conducting pipes, the object being to provide an improved valve of this class, whereby the free operation of the valves to open and close the passage through it is facilitated, whatever may be the fluid-pressure under which they are operated.

Figure 1:
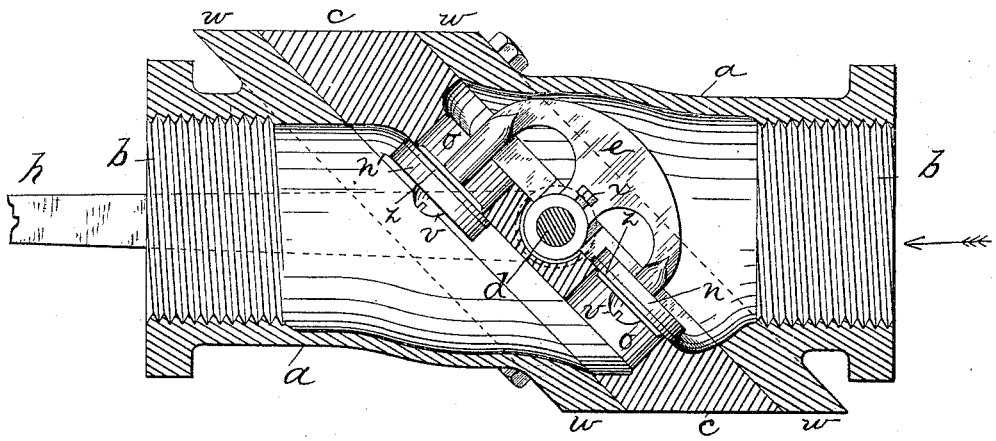
Figure 2:
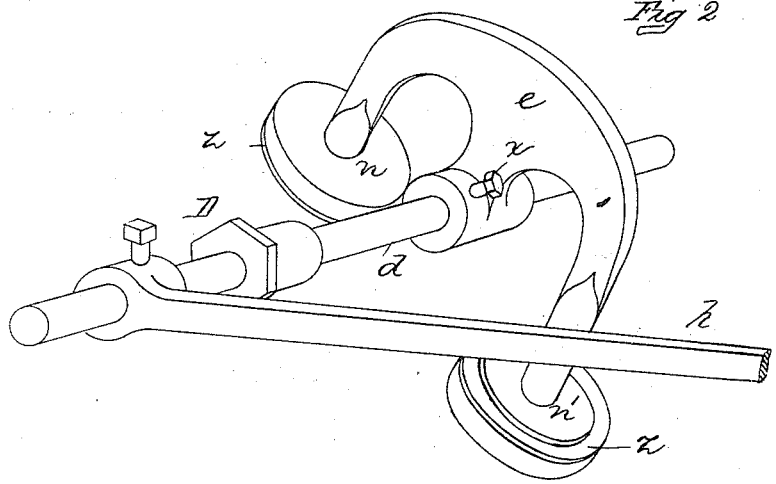

In the drawings forming part of this specification, Figure 1 is a longitudinal section of the body parts and the valve-seat diaphragm, and a side view of the valve-yoke and valves of a balanced valve embodying my improvements, said figure showing also the valve-shaft in cross-section and a portion of the valve-operating lever. Fig. 2 is a perspective view of the valve-yoke and valves, the valve-shaft with stuffing-box nut on it, and a portion of the operating-lever.

In the drawings, *a a* indicate the two end portions of the valve body or case, each of which is of a general tubular form, made of cast metal, preferably, and provided with a screw-threaded end, *b*, as shown, for the reception of the end of a connecting-pipe. Each of said body portions is also provided with a flange, *w*, on one end, whose face, as well as that portion of the body which it surrounds, is inclined, as shown, to the axial line of the body, and between said inclined flanges is located the inclined valve-seat diaphragm *c*, the latter being properly secured therebetween by suitable bolts passing through said flanges, as shown, whereby the body parts and diaphragm are rigidly secured together. The diaphragm *c*, of suitable metal, has through it two water-passages, *o o*, and between the latter a depression on one side thereof to permit of locating the valve-shaft and the hub of the valve-yoke *e* somewhat below the surface of the diaphragm, as shown. The valves below described have their seats on the borders of said passages *o o*. The valve-shaft *d* passes transversely through one side or edge of the diaphragm and beyond the passages *o* in the latter, one end projecting beyond the side of the valve to permit of attaching thereto the operating-lever *h*, or other suitable device, for giving to said shaft a rocking motion. When said shaft is placed in the diaphragm, as aforesaid, the hub of the yoke *e* is held in said depression in the diaphragm and the shaft is passed through it, and by the set-screw *x* in said hub the valve-yoke is secured in proper position on the shaft, and at the same time the latter is so secured that it cannot move endwise in its bearings in the diaphragm.

The valve-yoke *e* is provided with two arms of unequal length, to the shorter of which is secured the valve *n*, which has a seat on the upper side of the diaphragm *c*, and to the longer arm, which passes through one of said passages *o*, is secured the valve *n'*, which has its seat on the under or opposite side of diaphragm *c* to that on which valve *n* is seated. A washer, *z*, of leather or other similar soft material, is secured on the bearing side of each of said valves to obtain a more perfect contact of valve and seat when the valve is shut.

The stuffing-box nut D is adapted to screw into a suitable socket in the edge of the diaphragm *c*, to hold packing therein in the usual way, and prevent water from leaking around the shaft *d*.

The operation of my improvements is as follows: The valve having been connected into a pipe through which water flows to a motor in the direction indicated by the arrow in Fig. 1, (or in the opposite direction,) water is permitted to pass through the valve by operating lever *h* to rock the shaft *d*, thereby lifting each valve *n n'* simultaneously from its seat and allowing the water to flow through the passages *o o* to the motor, or for other purposes, in greater or less volume, as may be desired; and since the water-pressure acts on one valve to force it against its seat and on the other valve to force it from its seat, and with substantially the same force in both instances, said valves are balanced between said opposing pressures, and they are moved toward and from their seats by the application of very little force to lever *h*, whereby shaft $d$ and the yoke $e$ are rocked, as aforesaid; and, furthermore, said valves are so evenly balanced that when they are moved to any position from their seats on the diaphragm, or against the latter, it is unnecessary to employ any means to cause them to remain in such positions, but they are so held by the action of the water thereon.

What I claim as my invention is—

A balanced valve consisting of the parts $a\ a$ of the body, having the usual inlet and outlet ends, and having their opposite ends inclined to the axial line of said body parts, and surrounded by the flanges $w\ w$, the diaphragm $c$, secured between said flanges, having the water-passages $o\ o$ therethrough, and between the latter a depression, substantially as described, on one side of the diaphragm, the valve-shaft $d$, having one end projecting beyond the edge of the latter, and its opposite end entering the diaphragm, in which it has a bearing, and extending across said depression the valve-yoke $e$, having arms of unequal length, and the valves $n\ n'$ thereon, secured on shaft $d$, with its hub in said depression, and means, substantially as described, for giving a rocking motion to said shaft, substantially as set forth.

ELIJAH B. BENHAM.

Witnesses:
H. A. CHAPIN,
W. F. RICE.